United States Patent [19]
Kamasako

[11] 3,829,865
[45] Aug. 13, 1974

[54] ELECTRIC EXPOSURE METER WITH OPERATIONAL FUNCTION
[75] Inventor: Shoji Kamasako, Tokyo, Japan
[73] Assignee: Asahi Kogaku Kogyo Kabushiki Kaisha, Tokyo-To, Japan
[22] Filed: Apr. 4, 1973
[21] Appl. No.: 347,693

[30] Foreign Application Priority Data
Apr. 14, 1972 Japan.......................... 47-44152[U]

[52] U.S. Cl.................................. 354/24, 356/223
[51] Int. Cl............................................ G03j 1/42
[58] Field of Search...... 95/10 CE, 10 CT; 356/218, 356/223, 226

[56] References Cited
UNITED STATES PATENTS
3,528,350   9/1970   Schmitt................................... 95/10
3,731,603   5/1973   Ono et al................................ 95/10

Primary Examiner—Samuel S. Matthews
Assistant Examiner—Michael L. Gellner
Attorney, Agent, or Firm—Christie, Parker & Hale

[57] ABSTRACT
An electric exposure meter for receiving light from an object and for indicating camera aperture value, exposure time or object brightness. A differential amplifier has first and second inputs and an output. An output signal is formed across the output proportional to the difference between signals applied at each of the inputs. A first circuit includes a photo sensitive element for sensing object light and providing a corresponding object brightness signal to the first input. A memory circuit is coupled to the first input and to the object brightness signal for storing a corresponding signal and for applying the stored signal to the first input. A second circuit has a second output circuit and includes: a first manually adjustable resistor for causing an adjustable voltage to be applied by the second circuit at the second output circuit representative of the difference between film sensitivity and exposure time or between film sensitivity and aperture value; a second resistor for causing a constant prefixed voltage to be applied by the seocnd circuit at the second output circuit; and a switch for switching the second output circuit between the first resistor and the second resistor. A meter is coupled across the differential amplifier output circuit. The second output circuit is coupled to the second input to thereby cause a signal across the differential amplifier output circuit and a direct meter indication indicative of aperture value on exposure time or object brightness.

11 Claims, 1 Drawing Figure

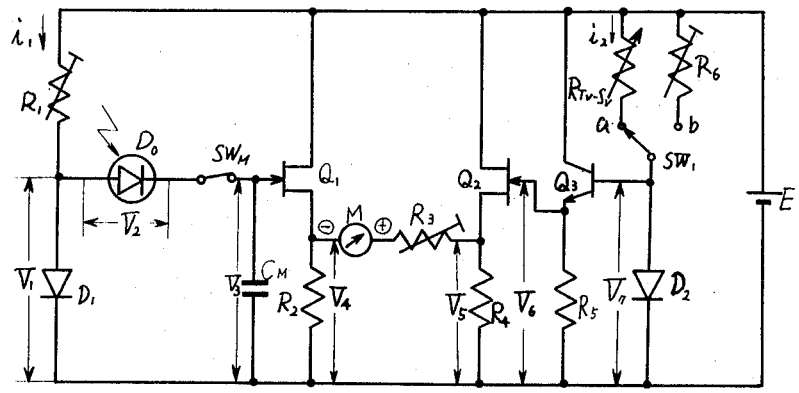

3,829,865

ELECTRIC EXPOSURE METER WITH OPERATIONAL FUNCTION

BACKGROUND OF THE INVENTION

The present device relates to an exposure meter of indicator type wherein the electric circuit in the interior thereof has an operational function to produce an automatic indication of aperture value or exposure time as well as of brightness in case of the predetermined film sensitivity, exposure time or aperture time, and a memory function.

The conventional indicator type exposure meters have required onerous operations because the aperture value of diaphragm or the exposure time is chosen by means of a calculating plate after the brightness or illumination in the field of an object to be photographed is measured. Exposure meters in which the calculating plate is driven by a servo-motor to simplify the operation are commercially available, but their responsiveness is not satisfactory.

SUMMARY OF THE INVENTION

Briefly, an electric exposure meter for directly indicating a photographic parameter in accordance with the present invention is as follows. First and second circuits are provided, each comprising a field effect transistor having input, output and control electrodes, impedance means, means for serially connecting the impedance means to one of the input and output electrodes and means for providing an electrical signal across the series circuit formed by the input and output electrodes and the impedance means. A first photometric parameter control circuit comprises a variable resistor means, non-linear circuit means, means for serially connecting the variable resistor means to the non-linear circuit means, means for providing an electrical signal across the serially connected variable resistor means and non-linear circuit means, photosensitive means having first and second sides are coupled between the control electrode of the transistor in the first circuit and the connection of the variable resistor means and the non-linear circuit means, and switching means are coupled in between the photosensitive means and the control electrode in the first circuit. A second photometric parameter control circuit comprises an adjustable voltage divider circuit comprising an output and variable resistor means which is variable in accordance with a photographic parameter for forming a corresponding signal at the output, and means for coupling the output to the control electrode in the second circuit. An indicator is coupled between at least one electrode in the first and second circuits to indicate the difference in signal therebetween.

Preferably, the non-linear circuit means of the first photometric parameter control circuit is a diode. According to a further preferred embodiment, the adjustable voltage divider circuit comprises a non-linear circuit means connected in series with the variable resistor means. According to a further preferred embodiment, the non-linear circuit means of the adjustable voltage civider circuit and the first photometric control circuit each comprise a semi-conductor diode. In a still further preferred embodiment, the photosensitive means is characterized by providing a photo-electromotive logarithmic characteristic thereacross. According to an additional preferred embodiment, the photosensitive means comprises a diode which is characterized in that it provides a logarithmic characteristic in voltage thereacross with changes in current therethrough.

BRIEF DESCRIPTION OF THE DRAWING

The present invention will be better understood by the following description of an example of an embodiment in reference to an annexed drawing, which is a schematic circuit diagram showing an electric exposure meter and embodies the present invention.

DESCRIPTION OF THE PREFERRED EMBODIMENT

A bias circuit has a variable resistor $R_1$ serially connected to a a logarithmic conversion element $D_1$. The element $D_1$ is a conventional germanium diode or a silicon diode. If the bias circuit is fed with a current $i_1$ from a power source E, a bias voltage $\overline{V_1}$, corresponding to a logarithmic value of the current $i_1$ is produced between the terminals of the logarithmic converter $D_1$. A light sensitive diode element $D_o$ of semiconductor PN type $D_o$ is connected to the connecting point between the preset and variable resistor R and the logarithmic conversion element $D_1$. The interterminal voltage $\overline{V_3}$ of a memory condensor $C_M$ is connected to the light-receiving element $D_o$ through a switch $SW_M$. $\overline{V_3}$ is equal to $\overline{V_1} - \overline{V_2}$ wherein $\overline{V_2}$ is the voltage across the light-receiving element $D_o$. The photoelectromotive voltage $\overline{V_2}$ produced between the terminals of the light sensitive element $D_o$ can be approximately represented by the following formula:

$$\overline{V_2} = k_1 \log L \tag{1}$$

wherein L is illumination on the light-receiving surface of the element $D_o$ and $k_1$ is a constant peculiar to the light-receiving element $D_o$.

Precisely, the photo-electromotive voltage $\overline{V_2}$ is proportional to the logarithmic value of the illumination L determined by the brightness of an object to be photographed. Therefore, the interterminal voltage $\overline{V_3}$ of the memory condensor $C_M$ is represented by the following formula:

$$\overline{V_3} = -k_1 \log L + V_1 \tag{2}$$

The output voltage $\overline{V_4}$ is across resistor $R_2$ of a source transistor follower circuit formed by resistor $R_2$ and FET $Q_1$. The input voltage to the circuit formed by $R_2$ and $Q_1$ is the interterminal voltage $\overline{V_3}$ of the memory condensor $C_M$. Output voltage $\overline{V_4}$ is represented by the following formula:

$$\overline{V_4} = -G_1 k_1 \log L + V_1 \tag{3}$$

wherein $G_1$ is gain of the source transistor follower circuit formed by the FET $Q_1$ and the resistor $R_2$ and $V_1$ is a constant. The output voltage $\overline{V_4}$ is proportional to a logarithmic value of the object brightness B and to an APEX index $B_1$ of the object brightness B.

A manually adjustable resistor $R_{T_1-S_1}$ is manually controlled or adjusted to a proper resistance value according to desired exposure time T and sensitivity S of the film being used. Diode $D_2$ is a conventional germanium diode or a silicon diode and because of its current characteristics, forms a logarithmic conversion element.

A series circuit is formed by the logarithmic conversion element $D_2$ serially connected to the resistor $R_{T_V-S_V}$ through a switch $SW_1$. A current value $i_2$ flows as a result of the voltage E from the power source E across the series circuit of $R_{T_V-S_V}$ and $D_2$ and is inversely proportional to the resistance value of the variable resistor $R_{T_V-S_V}$, which is determined corresponding to the quotient $T/S$ of the exposure time $T$ and the film sensitivity $S$ and is represented by the following formula:

$$i_2 = k_2 \, (E/T/S) \tag{4}$$

The variation of the terminal voltage $\overline{V_7}$ across the logarithmic conversion element $D_2$ corresponding to the variation of the current $i_2$ is negligible compared with the voltage of the power source voltage E. Therefore, the terminal voltage $\overline{V_7}$ of the logarithmic conversion element $D_2$ is proportional to the logarithm of the quotient $T/S$ of the exposure time $T$ and the film sensitivity $S$ and causes the following relationship:

$$\overline{V_7} = k_3 \log i_2 + V_2 = k_3 \, (\log k_2 E + \log S - \log T) + V_2 \tag{5}$$

$k_3$ is a constant peculiar to the logarithmic conversion element $D_2$ and $V_2$ is a constant.

The formula 5 can be arranged as follows:

$$\overline{V_7} = k_3 \log S - k_3 \log T + V_3 \tag{6}$$

wherein $V_3$ is a constant.

The terminal voltage $\overline{V_7}$ of the logarithmic conversion element $D_2$ produces an output voltage $\overline{V_5}$ through a source transistor follower circuit formed by a transistor $Q_3$ and a resistor $R_5$ and through a source transistor follower circuit formed by a FET $Q_2$ and a resistor $R_4$. $\overline{V_5}$ is represented as follows:

$$\overline{V_5} = G_2 \overline{V_7} = G_2 k_3 (\log S - \log T) + V_4 \tag{7}$$

wherein $G_2$ is total voltage gain of the source transistor follower circuit and the source transistor follower circuit formed by the transistor $Q_3$ and the resistor $R_5$, and by the FET $Q_2$ and the resistor $R_4$ respectively, and $V_4$ is a constant determined in designing the circuit.

To make the output voltage $\overline{V_5}$ proportional to the algebraic total $(S_V - T_V)$ of the APEX indexes $S_V$ and $T_V$ for the film sensitivity $S$ and the exposure time $T$, respectively, it is essential that the variation of the voltage $\overline{V_5}$ corresponding to the unit variation of the value $S_V$ or $T_V$ be made equal to the variation of the voltage $\overline{V_4}$ corresponding to the unit variation of the value $B_V$. This requirement is represented by the following equality according to the said formulas (3) and (4):

$$G_1 k_1 = G_2 k_3 \tag{8}$$

The characteristics of resistance conversion for the variable resistor $R_{T_V-S_V}$, the voltage gain $G_1$ of the source transistor follower circuit formed by the FET $Q_1$ and the resistor $R_2$, and the total voltage gain $G_2$ of the source transistor follower circuit formed by the transistor $Q_3$ and the resistor $R_5$ and the source transistor follower circuit formed by the FET $Q_2$ and the resistor $R_4$ are easily determined so as to satisfy the Formula 8. Therefore, the voltage $\overline{V_5}$ is variable proportionally to the APEX indexes $S_V$ and $T_V$ of the film sensitivity $S$ and the exposure time $T$, respectively. The interterminal voltage $\overline{V_5} - \overline{V_4}$ between the terminal voltages $\overline{V_5}$ and $\overline{V_4}$ is indicated by a current sensing meter M in series with a resistor $R_3$. The meter M is characterized by a high degree of linearness and therefore the terminal voltage $\overline{V_5} - \overline{V_4}$ is indicated by the meter M and is proportional to the APEX index $A_V$ of the aperture value $A$ so that the deflection angle of the meter M is also proportional to the apex index $A_V$ of the aperture value $A$.

The switch $SW_1$ has a second position wherein it is connected to the indication side $b$ for the APEX index $B_V$ of the object brightness $B$. When $SW_1$ is connected to side $b$, the index $B_V$ is indicated on the meter M in the same fashion as the index $A_V$ is indicated. If the output voltage $\overline{V_5}$ of the FET $Q_2$ is constant, the illumination on the light sensitive element $D_o$ is L and the FET $Q_2$ is only a bias source for the meter M. A preset variable resistor $R_6$ regulates the level of indicated APEX indexes $B_V$ of object brightness on the meter M.

A memory mechainsm is realized by charging the memory condensor $C_M$ with the gate voltage $\overline{V_3}$ for the FET $Q_1$ and by subsequently opening the switch $SW_M$ to separate the light-receiving element $D_o$ from the condensor $C_M$.

The very high input impedance of the FET $Q_1$ causes the discharge time to be long and the gate voltage $V_3$ remains essentially constant so that afterwards, the indicated value on the meter M does not change. However, the illumination on the light-receiving element $D_o$ changes. As a result, it is possible to measure the brightness of an object at any moment easily by closing switch $SW_M$, or to continue to indicate the measured value fixedly without the added step of adjusting the meter M by leaving switch $SW_M$ open.

As described, the present invention has significant advantages in that the calculations normally required after the photometric operation of an exposure meter can be eliminated. Also, the indicator is fixed at a measured value for a long time by means of a memory mechanism so that an operator can easily read the measured values and be able to measure the same value repeatedly in case the value has been forgotten. The exposure meters according to the present invention are applicable to various kinds of use.

Additionally, the measurement of $B_V$ permits the indication of $T_V$ on the meter M, whereas the measurement of $A_V$ permits the indication of $R_{A_V-S_V}$.

It will now be obvious that transistor $Q_1$ and resistor $R_2$ form a source transistor follower circuit and that transistors $Q_2$ and $Q_3$ and associated resistors $R_4$ and $R_5$ form a second source transistor follower circuit. Also, the two source transistor follower circuits form a differential amplifier having inputs at the base of $Q_1$ and $Q_3$ and outputs at the junction of $R_2$ and $Q_1$ and $R_4$ and $Q_2$.

The following method is adopted actually to determine the resistance value of the variable resistor $R_{TV-SV}$ in accordance with $T/S$ that is the quotient of exposure time $T$ and film sensitivity $S$. The values of exposure time $T$ and film sensitivity $S$ are adjusted by movement in accordance with logarithmic values obtained by APEX calculation of actual values. The adjusting means is, therefore, constructed so as to make the above adjustment and further to change the resistance value of the electric resistor in response to amount of movement for adjustment. The set dial of exposure time $T$ and the set dial of film sensitivity $S$ are usually kept moving together because of friction between two dials. When one of the dials is fixed by a finger tip to operate the dials against friction, the other dial can be moved independently. In this case, difference between logarithmic values correspnding to the actual values to be adjusted, i.e., the quotient $T/S$ can be obtained between two dials as a resistance value of the variable resistor $R_{TV-SV}$.

What is claimed is:

1. An electric exposure meter for directly indicating a photographic parameter comprising:
   a. first and second source follower circuits, each comprising an output circuit, a field effect transistor having a control electrode and an electrode coupled to said output circuit;
   b. a first photometric parameter control circuit comprising
      i. variable resistor means,
      ii. non-linear circuit means,
      iii. means for serially connecting the variable resistor means to the non-linear circuit means,
      iv. means for providing an electrical signal across the serially connected variable resistor means and non-linear circuit means,
      v. photosensitive means having first and second sides coupled between the control electrode of the transistor in the first circuit and the connection of the variable resistor means and the non-linear circuit means, and
      vi. switch means coupled in between the photosensitive means and the control electrode in the first source follower circuit,
   c. a second photometric parameter control circuit comprising
      i. an adjustable voltage divider circuit comprising an output and variable resistor means which is variable in accordance with a photographic parameter for forming a corresponding signal at the output, and
      ii. means for coupling the output to the control electrode in the second source follower circuit; and
   d. an indicator coupled between the output circuits of said first and second circuits to indicate the difference in signal therebetween.

2. A meter according to claim 1 wherein said non-linear circuit means of said first photometric parameter control circuit comprises a diode.

3. A meter according to claim 1 wherein said adjustable voltage divider circuit comprises a non-linear circuit means connected in series with said variable resistor means.

4. A meter according to claim 3 wherein said non-linear circuit means comprises a diode.

5. An electric exposure meter for directly indicating a photographic parameter comprising:
   a. first and second circuits, each comprising
      i. a field effect transistor having input, output and control eletrodes,
      ii. impedance means,
      iii. means for serially connecting the impedance means to one of the input and output electrodes, and
      iv. means for providing an electrical signal across the series circuit formed by the input and output electrodes and the impedance means;
   b. a first photometric parameter control circuit comprising
      i. variable resistor means,
      ii. non-linear circuit means,
      iii. means for serially connecting the variable resistor means to the non-linear circuit means,
      iv. means for providing an electrical signal across the serially connected variable resistor means and non-linear circuit means,
      v. photosensitive means having first and second sides coupled between the control electrode of the transistor in the first circuit and the connection of the variable resistor means and the non-linear circuit means, and
      vi. switch means coupled in between the photosensitive means and the control electrode in the first circuit;
   c. a second photometric parameter control circuit comprising
      i. an adjustable voltage divider circuit comprising an output and variable resistor means which is variable in accordance with a photograhic parameter for forming a corresponding signal at the output, and
      ii. means for coupling the output to the control electrode in the second circuit; and
   d. an indicator coupled between the at least one electrode in the first and second circuits to indicate the difference in signal therebetween.

6. A meter according to claim 5 wherein said non-linear circuit means of said first photometric parameter control circuit comprises a diode.

7. A meter according to claim 5 wherein said adjustable voltage divider circuit comprises a non-linear circuit means connected in series with said variable resistor means.

8. A meter according to claim 7 wherein said non-linear circuit means of said adjustable voltage divider circuit and first photometer control circuit each comprise a semiconductor diode.

9. A meter according to claim 5 wherein said photosensitive means is characterized by providing a photoelectromotive logarithmic characteristic thereacross.

10. A meter according to claim 9 wherein said photosensitive means comprises a diode which is characterized in that it provides a logarithmic characteristic in voltage thereacross with changes in current therethrough.

11. A meter according to claim 5 wherein said coupling means in said second photometric parameter control circuit comprises:
   a. a further transistor having control, input and output electrodes;
   b. impedance means;
   c. means for serially connecting the impedance means to one of the input and output electrodes of the further transistor;
   d. means for applying an electrical signal across the series circuit formed by the connected impedance means and the input and output electrodes; and
   e. means for coupling the one electrode of the further transistor to the control electrode in the second circuit, said photosensitive means and said further transistor each comprising semiconductor elements.

* * * * *